Aug. 22, 1961  J. P. HILL ET AL  2,997,314
AIR SPRING CONTROL MECHANISM
Filed June 18, 1958  2 Sheets-Sheet 2
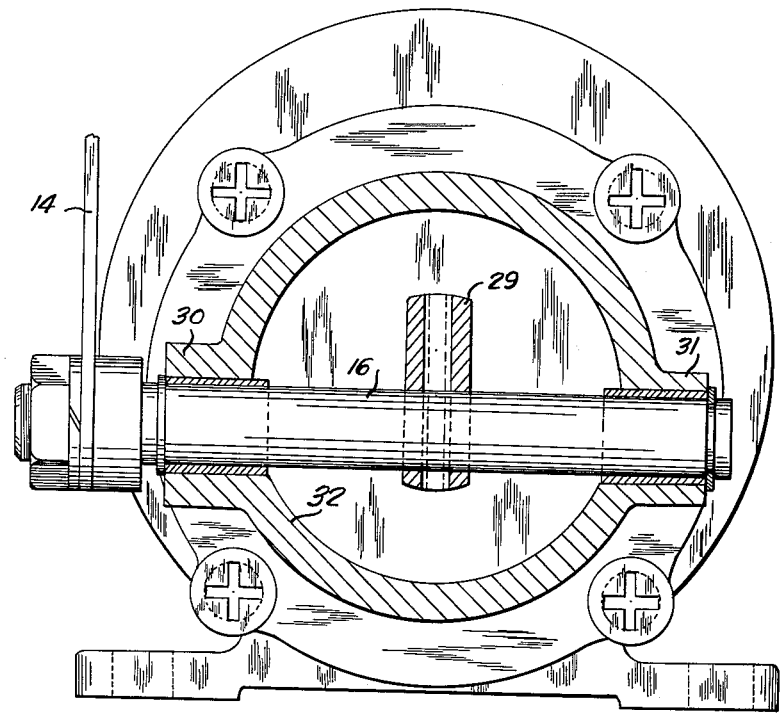
FIG. 3
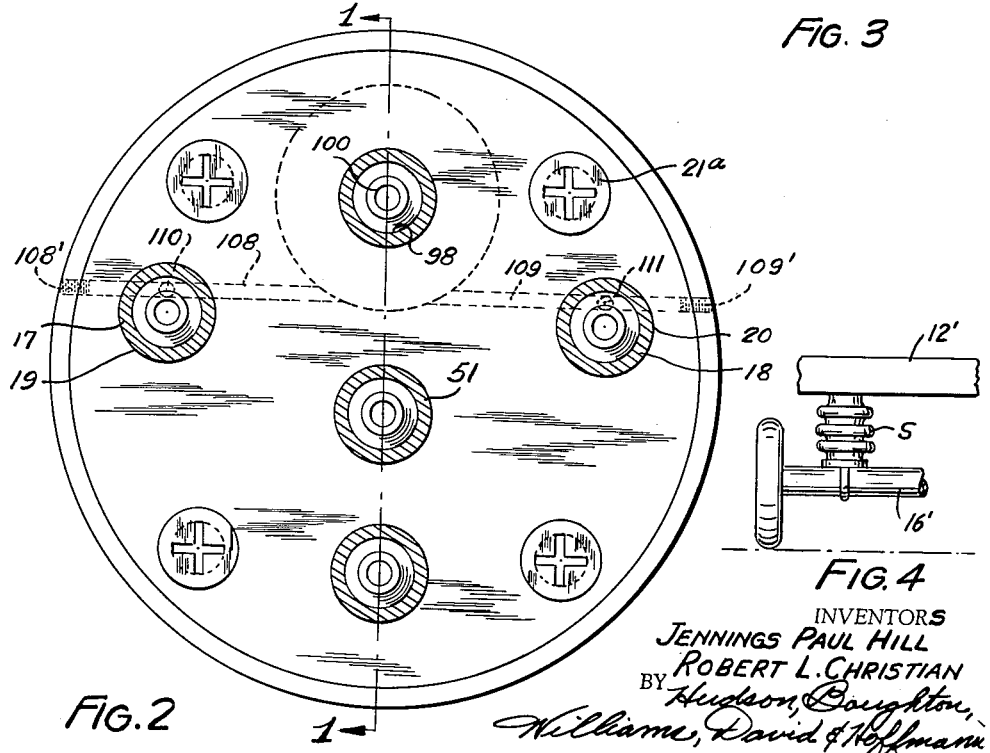
FIG. 2
FIG. 4
INVENTORS
JENNINGS PAUL HILL
ROBERT L. CHRISTIAN
BY Hudson, Boughton,
Williams, David & Hoffmann
ATTORNEYS

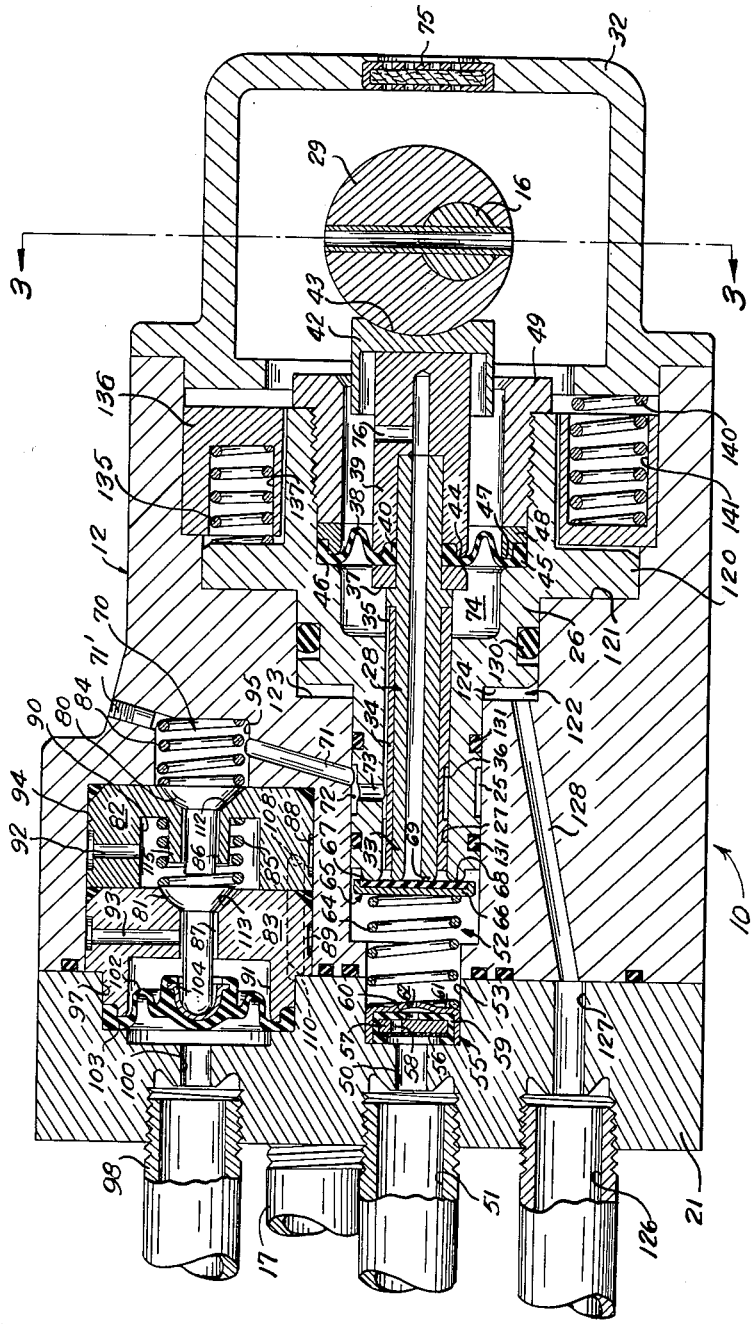

United States Patent Office 2,997,314
Patented Aug. 22, 1961

1

2,997,314
AIR SPRING CONTROL MECHANISM
Jennings Paul Hill, Lakewood, and Robert L. Christian, Chardon, Ohio, assignors to The Gabriel Company, Cleveland, Ohio, a corporation of Ohio
Filed June 18, 1958, Ser. No. 742,834
3 Claims. (Cl. 280—124)

The present invention relates to a control mechanism, and more particularly an air valve device for controlling the effective height of air springs in a pneumatic suspension system which can be used in connection with motor vehicles and similarly in other machines or apparatus where the relative distance between an unsprung mass and a sprung mass is desired to be regulated.

One of the principal objects of the present invention is to provide a novel control mechanism for controlling and/or adjusting the effective height of a pneumatic suspension system.

A still further object of the present invention is to provide a new and improved control mechanism, substantially as set forth in the preceding object, which is capable of normally automatically leveling or regulating the pneumatic suspension system at a slow speed and at a fast or increased speed.

Another object of the present invention is to provide in an air suspension system a leveling valve for controlling the distance between the sprung and unsprung mass, which leveling valve can be automatically adjusted to selectively control the distance between the sprung and unsprung masses at any one of a plurality of preselected distances.

An additional object of the invention is to provide a leveling valve as set forth in the preceding object, which will operate in a normal manner in any one of the plurality of preselected distances.

Another object of the present invention is to provide a leveling valve for use in controlling the effective height of the air springs in a pneumatic suspension system, which leveling valve can operate to control the inflation and/or deflation of the air springs at two speeds and the leveling valve can also be operated to selectively maintain the air springs at any one of three discrete heights.

Another object of the present invention is to provide a new device which will maintain the frame of a vehicle at a predetermined mean height above the wheel axles, regardless of a load increase or decrease in the vehicle, in combination with an override mechanism for selectively maintaining the vehicle frame height above its axles at any one of a plurality of discrete heights.

Another object of the present invention is to provide a control mechanism for a motor vehicle pneumatic suspension system, which control mechanism is of a simple structural design capable of controlling the inflation or deflation of the air spring means of the pneumatic suspension system in accordance with increases or decreases in the load applied to the sprung mass of the vehicle in order to maintain the mass at a predetermined mean riding height, the control mechanism being readily adjustable to vary the mean riding height to any one of a plurality of predetermined heights.

Further, the additional objects and advantages not hereinbefore referred to will become apparent hereinafter during the detailed description of a preferred embodiment of the invention which is to follow and which are embodied and illustrated in the accompanying drawings, wherein:

FIG. 1 is a vertical sectional view of the invention in its preferred form taken along line 1—1 of FIG. 2;

FIG. 2 is an end view of FIG. 1, showing the provision for conduit connections to two different air spring means,

2 a fixed leveling pressure air supply, a regulating air supply, and an override air supply;

FIG. 3 is a sectional view of a mechanical actuating mechanism taken along line 3—3 in FIG. 1; and FIG. 4 is a fragmentary end view of a vehicle showing an axle and a frame with air spring means connected therebetween.

It is to be understood that the invention is not limited to the details of construction and arrangement of parts shown in the drawings and hereinafter described in detail, but is capable of being otherwise embodied and of being practiced and carried out in various ways. It is also to be understood that the phraseology or terminology employed herein is for the purpose of description and there is no intention to herein limit the invention beyond the requirements of the prior art.

Referring to FIG. 1, the control mechanism, and more particularly an air valve means hereinafter referred to as a leveling valve, is indicated generally by the reference numeral 10. By way of example in describing the present invention, since it is understood that the control mechanism can be used for controlling a pneumatic suspension system in connection with various machines and apparatuses, the leveling valve 10 has a housing 12, which is preferably rigidly secured to the sprung mass of a motor vehicle, such as the body or frame 12', and a leveling arm or actuating lever 14 having one of its ends pivotally secured to an actuating shaft 16 of the leveling valve 10 and the other end operatively secured to the unsprung mass of the motor vehicle, such as the axle 16', in a conventional manner. The actuating lever 14 moves up and down when the sprung mass moves towards and away from the unsprung mass of the motor vehicle and, accordingly, operates to admit pressurized air to the air spring means S of the pneumatic suspension system and permits the exhaust of pressurized air from the air spring means respectively. A pair of air springs S may be controlled with the air springs being connected to conventional conduits 17 and 18 threaded into the ports 19 and 20 in an end cap 21, which is secured to one end of the housing 12 of the valve 10 by conventional means, such as screws 21ª.

Leveling valve

More particularly, the housing 12 has a concentrically stepped bore 25 therein for slidably receiving a similarly stepped override piston 26. The override piston 26, having a stepped bore 27 therethrough, has a hollow plunger assembly 28 slidably disposed therein. The override piston 26 and plunger assembly 28 are adapted to be moved independently of each other for a limited axial distance, with the plunger assembly 28 being axially movable by means of a circular cam 29 eccentrically and rigidly secured to the actuating shaft 16 at a medial point on the shaft 16 between the portions of the shaft journaled in bosses 30 and 31 of a cup-shaped shaft housing 32 having a rabbet face mounted in and secured to an open axial end of stepped bore 25 in housing 12 in a known manner.

The plunger assembly 28 is comprised of a cylindrical hollow stem 33 with a cylindrical sleeve 34, which has an axially extending groove 35 and a peripherally extending groove 36 in the outer surface thereof, disposed over a reduced one end of the stem 33. A flat washer 37 is disposed over a reduced other end of stem portion 33 so as to seat a flexible annular diaphragm 38 on its juxtaposed flat, radially extending surface, which diaphragm 38 serves to hermetically partition stepped bore 27 in override piston 26. A cup-shaped head member 39 encloses the reduced outer end of hollow stem 33 and biases an annular bead 40 of diaphragm 38 against the flat radial end face of washer 37, the rim 44 of the cup-shaped head member 39 being dished and substantially similar to the configuration of the juxtaposed inner bead 40 of the flexible diaphragm 38. A cup-shaped cam follower 42, preferably consisting of a shiftable nylon shoe, is loosely fitted over the outer end of head member 39 so as to permit considerable transverse shifting movement thereof radially over the closed end of head member 39. The circular cam 29 has an arcuate peripheral portion slidingly engaging cam follower 42 in a correspondingly semispheroidal cavity 43 in the end face thereof.

The outer periphery of the flexible diaphragm 38 is provided with a bead 45 similar to the inner bead 40 thereof, the outer periphery of the flexible diaphragm 38 being sandwiched between a shoulder 46 of the stepped inner surface of override piston 26 and a shoulder 47 of a ring 48 concentrically nested in the stepped bore 27. The ring 48 is urged in an axial direction toward shoulder 46 into engagement with bead 45 of diaphragm 38 by means of an externally threaded sleeve 49 threaded into a corresponding end of override piston 26.

A passage 50 in end cap 21 connects a regulating air port 51 with a spring chamber 52 formed by a cylindrical recess 53 in end cap 21 and the communicating opening formed by stepped bore 25 in housing 12.

A flapper type check valve 55, consists of a perforated disk 56 and a flat disk 57 with an eccentrically located passage 58 formed therein held in assembly by an elastomeric flapper valve diaphragm 59 which substantially encases the disks 56 and 57 but permits passage of pressure air from regulating air port 51 through the perforated disk 56, the passage 58 in disk 57, and between a face of disk 57 and diaphragm 59 to the spring chamber 52 via a valve port 60 centrally formed in the diaphragm 59. However, the flapper type check valve 55 does not permit air flow in a reverse direction from spring chamber 52 to air port 51 due to the closure of passage 58 by a juxtaposed annular portion of the diaphragm 59 when the same is flexed thereagainst and the laterally offset, noncommunicating relationship of passage 58 with diaphragm port 60.

A generally cup-shaped metal jacket 61, having a centrally located opening 62 in a concave bottom thereof and adapted to be aligned with the diaphragm port 60, substantially encloses the subassembly of the disks 56, 57 and diaphragm 59. Jacket 61 is rigidly secured in the cylindrical recess 53 of end cap 21 so as to control passage 50 therein.

A light helical compression spring 64 has one end seated against jacket 61 of check valve 55 and the other end biasing a flat valve 65, comprised of a dished metal plate 66 and an elastomeric valve 67 secured in the dished portion of plate 66, into sealing engagement with the rounded terminal, annular and concentrically disposed ends 68, 69 of override piston 26 and stem 33 of plunger assembly 28, respectively.

Upon the cam 29 being turned or pivoted in a counter-clockwise direction resulting from the leveling arm 14 being pivoted downwardly due to a closing of the distance between the sprung mass and unsprung mass and accordingly with the reduction in air spring height, the plunger assembly 28 is urged to the left, FIG. 1, sufficiently to push flat valve 65 away from the rounded annular end 68 of override piston 26 and permit regulating pressure air to flow from the spring chamber 52, which normally restricts the flow of air therethrough, into the axially extending groove 35 and the peripheral groove 36 of the plunger assembly 28 to the air springs via a spring air metering chamber means 70 which connects with the groove 36 by means of a transverse passage 71 in valve housing 12 and a peripheral groove 72 and a communicating transverse passage 73 in override piston 26. The end of the transverse passage 71 is plugged in a conventional manner as with a plug 71'.

The axially extending groove 35 also communicates with an anular pneumatic pressure chamber 74 formed by stepped bore 27 in override piston 26 and the flexible diaphragm 38 for normally urging plunger assembly 28 into engagement with the cam 29. The shaft housing 32 is ventilated to the atmosphere by means of a perforated and hollow ventilating disk 75 filled with a noise dampening material such as felt, which disk 75 is securely fitted in a counterbored port in the end face of shaft housing 32.

Upon rotating the cam 29 in a clockwise direction, FIG. 1, caused by an overextended distance between the sprung and unsprung mass, the plunger assembly 28 is urged to the right and away from the flat valve 65 by the air pressure in chamber 74, which is substantially the same as the air pressure acting against diaphragm 38. Movement of the plunger assembly 28 away from flat valve 65 permits air to flow from air metering chamber valve 70 via passage 71 of valve housing 12, groove 72 and passage 73 of override piston 26, peripheral groove 36 and axially extending groove 35 of plunger 28, around the annular end 69 of and through the hollow stem 33 of plunger 28, out of the same through a transverse outlet hole 76 therein, past the shiftable nylon shoe 42 into the interior of shaft housing 32 and out of the same to the atmosphere by way of the felt noise dampener 75.

*Slow and fast leveling feature*

The air metering chamber means 70 is comprised of two generally similar coaxially arranged tandem poppet valves 80 and 81, normally biased against annular valve seats 82 and 83 by valve closing or return helical compression springs 84 and 85, respectively, for controlling valve ports 86 and 87 in the respective valve seats 82 and 83.

The poppet valve seats 82 and 83 are cylindrically formed with peripheral grooves 88 and 89 and internal annular cavities 90 and 91, respectively. Groove 88 communicates with annular cavity 90 formed in the seat 82 via a radial opening 92 and groove 89 communicates with valve port 87 via a similar radial opening 93. The valve seat 82 is bottomed in a cylindrical recess 94 in valve housing 12 with valve seat 83 placed over the valve seat 82 in such a manner that valve return spring 85 has one end seated against the underside of valve seat 82 in annular recess 90 and the other end seated against the adjacent flat face of the poppet valve 81 for biasing the same against its valve seat 83. The other valve return spring 84 is seated in a small cylindrical cavity 95 coaxially formed in the bottom of cylindrical recess 94 with one end reacting against the bottom of cavity 95 and the other end biasing poppet valve 80 into normally closed relationship with its valve seat 82.

The outer end of the valve seat 83 extends into a stepped bore 97 which communicates with a fast level air port 98 via a connecting passage 100 in end cap 21. A flexible circular diaphragm 102 is provided with a peripheral bead portion 103 biased against an intermediate shoulder of stepped bore 97 by means of the outer end of valve seat 83 for hermetically isolating passage 100 from cavity 91. The central portion of the diaphragm 102 is provided with a metal socket cup 104 for fitting over the rounded outer stem end of poppet valve 81.

The air spring conduit connecting ports 19 and 20 respectively connect with peripheral grooves 88 and 89 in valve seats 82, 83 by way of transverse, chordally extending conduits 108 and 109 and longitudinally extending drill holes 110 and 111 in valve housing 12, the outer ends of chordally extending conduits being plugged in a conventional manner, such as with plugs 108' and 109'.

The valve ports 86 and 87 are of a dimension slightly greater than the stems of poppet valves 80 and 81 so as to respectively accommodate the passage of the same therethrough and also permit the metering of pressurized air therethrough in either direction. The poppet valve seats 82 and 83 each have a small air bleed slot 112 and 113 therein, respectively, for bleeding air or restricting the passage of air past the normally closed poppet valves 80 and 81 so as to meter the same from and to the air springs. The foregoing air metering feature accounts for the slow and barely perceptible change in effective height or leveling of the air springs during the normal operation of the leveling valve 10.

Should it be desired to increase the flow of air past poppet valves 80 and 81 in spring air metering chamber means 70, a charge of pressurized air of sufficient quantity is injected through fast level port 98 and against circular diaphragm 102 for biasing poppet valve 81 open and against the adjacent stem of poppet valve 80 for urging the same outwardly into an open position, to a distance governed by the travel of the diaphragm 102 in moving from its normal position to the innermost face of the cavity 91 in the valve seat 83.

As a result, air can pass through the spring air chamber means 70 between the air springs and the regulating air supply port 51 or to the atmosphere via shaft housing 32, depending upon whether the air springs are being respectively increased or decreased in effective height.

*Override feature*

When the air springs are being operated at a normal level, a radial flange 120 of override piston 26 normally seats against a corresponding intermediate shoulder 121 of stepped bore 25 in housing 12 in which piston 26 is adapted to slidably reciprocate a relatively small axial distance. However, when it is desired to operate the air springs at a higher level, the normal operating level can be overriden by admitting pressurized air to an override chamber 122, defined by an inner shoulder 123 of housing 12 and an opposed hub portion 124 of piston 26, via an override port 126 and connecting passage 127 in end cap 21 and an oblique interconnecting passage 128 in housing 12.

Escape of air from override chamber 122 is essentially prohibited between the override piston 26 and stepped bore 25 in housing 12 by conventional means such as a large O-ring 130 in a grooved hub portion 124 of override piston 26 and two smaller O-rings 131 seated in peripheral grooves located on either side of peripheral groove 72 in override piston 26.

Upon the admission of pressurized air to override chamber 122, the override piston is urged outwardly of stepped bore 25 until its flange 120 compresses a plurality of equiangularly spaced light helical springs 135 and the flange 120 abuts against a spring housing 136 in which the springs 135 are seated, the springs 135 being partially housed in cylinders 137 in the spring housing 136. Heavy helical springs 140 partially housed in oppositely facing equiangularly spaced cylinders 141 in spring housing 136 bear against the rabbeted end of shaft housing 32 and prevent further outward movement of override piston 26, the spring housing being spaced from rabbeted end of the shaft housing 32. The slight shifting of the override piston 26 to the right, away from flat valve 65, permits regulating pressure air to be admitted to the air springs via axial groove 35 and peripheral groove 36 in plunger 28, port 73 and peripheral groove 72 in override piston 26, and passage 71 and spring air chamber means 70 in housing 12.

The elevating of the air springs produces an upward swing of leveling arm 14 and a corresponding clockwise rotation, FIG. 1, of cam 29 and thereby permits plunger 28 to be pneumatically biased towards the right until its annular end 69 is substantially coplanar with the annular end 68 of override piston 26.

Upon admitting high pressure air, which is of a pressure in the range of 300 p.s.i., for example, as against a regular air pressure of 150 p.s.i., to the override chamber 122, the override piston 26 is urged farther to the right until flange 120 bears against spring housing 136 and the latter bears against the rabbeted end of closure cap 32, after successively overcoming the resistance of light springs 135 and heavy springs 140.

Accordingly, as the air spring height increases, the leveling arm is raised and cam 29 rotates clockwise until plunger 28 has its end 69 coplanar with end 68 of the override piston 26 and flat valve 65 seals off the pressure air in spring chamber 52 from the air springs of the pneumatic suspension system.

The upper discrete levels of the air springs are obtained, as is apparent hereinabove, by selectively admitting pressurized air of two different pressure levels, i.e., 150 p.s.i. air and 300 p.s.i. air. The air springs can be returned to normal operating level or height by collapsing the override chamber 122 and permitting the ends 68 and 69 of the piston 26 and plunger 28, respectively, to be realigned so as to be sealed off from the pressure air in spring chamber 52.

One of the principal advantages of the foregoing valve is that the level of the sprung mass above the unsprung mass can be arbitrarily adjusted to any one of the three lebels. For example, in traveling rough terrain, passing over bad dips or gutters, and in working on a motor vehicle from underneath, the level of the sprung mass, i.e. the body of the vehicle above the road level, can be conveniently adjusted.

In addition, the spacing between the discrete levels can be adjusted by merely adjusting the length of travel of the override piston 26 permitted by the override springs 135 and 140.

While we have shown and described a specific embodiment in accordance with our invention, it is understood that the same is susceptible of many changes and modifications, as known to a person skilled in the art, and we intend to cover all such changes and modifications coming within the scope of the appended claims.

Having thus described our invention, we claim:

1. A control mechanism for controlling the passage of pressure fluid therethrough comprising, a housing, piston means slidably disposed in said housing, hollow plunger means slidably disposed in said piston means, passage means formed intermediately of said piston means and said hollow plunger means, valve means adapted to seat on the corresponding ends of said piston means and said hollow plunger means, actuating means for shifting said hollow plunger means in said piston means in one direction so as to permit passage of pressure fluid past said valve means into said passage means and in another direction so as to permit the passage of pressure fluid out of said passage means into said hollow plunger means, and override means for repositioning said piston means relative to said hollow plunger means and permitting flow of pressure fluid past said valve means into said passage means, said actuating means being effective in response to operation of said override means to shift said plunger means to reseat the valve means on said corresponding ends.

2. A control mechanism for controlling the passage of pressure fluid therethrough comprising, a housing, piston means slidably disposed in said housing, hollow plunger means slidably disposed in said piston means, passage means formed between said piston means and said hollow plunger means, valve means adapted to normally seat on the corresponding ends of said hollow plunger means and said piston means, actuating means for shifting said hollow plunger means in said piston means in one direction so as to permit passage of pressure fluid past said valve means into said passage means and in another direction so as to permit the passage of pressure fluid out of said passage means into said hollow plunger means, override means for selectively repositioning said piston means to any one of a plurality of discrete axially spaced positions relative to said hollow plunger means and permitting flow of pressure fluid past said valve means into said passage means, and resilient means located in the path of sliding movement of said piston means effective to stop the piston means at each of said positions.

3. In motor vehicle air spring system for supporting a sprung mass relative to an upsprung mass, air valve means for controlling supply of air to the air spring system and exhaust of air from the air spring system to maintain the air spring system in a substantially uniform operating position irrespective of the loading condition upon the system, a housing secured to one of said masses, piston means slidably disposed in said housing, hollow plunger means slidably disposed in said piston means, passage means formed between said piston means and said hollow plunger means and communicating with said air spring system, said piston means and said hollow plunger means having substantially concentric annular ends, valve means biased against and seated on said substantially annular ends to control passage of air from one side of said valve means into said passage means and into said hollow plunger means, actuating means having one end pivotally journaled in said housing and the other end connected to the other one of said masses so that upon the distance between said sprung and unsprung masses changing said actuating means will be tilted for shifting said hollow plunger means in said piston means in one direction and permitting pressure air to flow past said valve means into said passage means and in the other direction for permitting pressure air to flow out of said passage means into said hollow plunger means, and override means for selectively repositioning said piston means to any one of a plurality of discrete axially spaced positions relative to said hollow plunger means and permitting flow of pressure fluid past said valve means into said passage means, said actuating means being effective in response to operation of said override means to reposition said plunger means to reseat the valve means on said annular ends.

References Cited in the file of this patent
UNITED STATES PATENTS

| | | |
|---|---|---|
| 1,087,305 | Lane | Feb. 17, 1914 |
| 1,583,140 | Goosman | May 4, 1926 |
| 2,443,433 | Sanmori | June 15, 1948 |
| 2,644,699 | Weiertz | July 7, 1953 |
| 2,787,475 | Jackson | Apr. 2, 1957 |
| 2,844,386 | Probonic | July 22, 1958 |
| 2,925,284 | Szostak | Feb. 16, 1960 |
| 2,939,723 | Wisniewski | June 7, 1960 |

FOREIGN PATENTS

| | | |
|---|---|---|
| 1,020,770 | France | Nov. 19, 1952 |

OTHER REFERENCES

SAE Journal, Publication, Feb. 1958, pages 50, 59, 60.